June 10, 1958  R. O. PETERSON  2,838,131
SEPARATOR
Filed Sept. 3, 1954  2 Sheets-Sheet 1
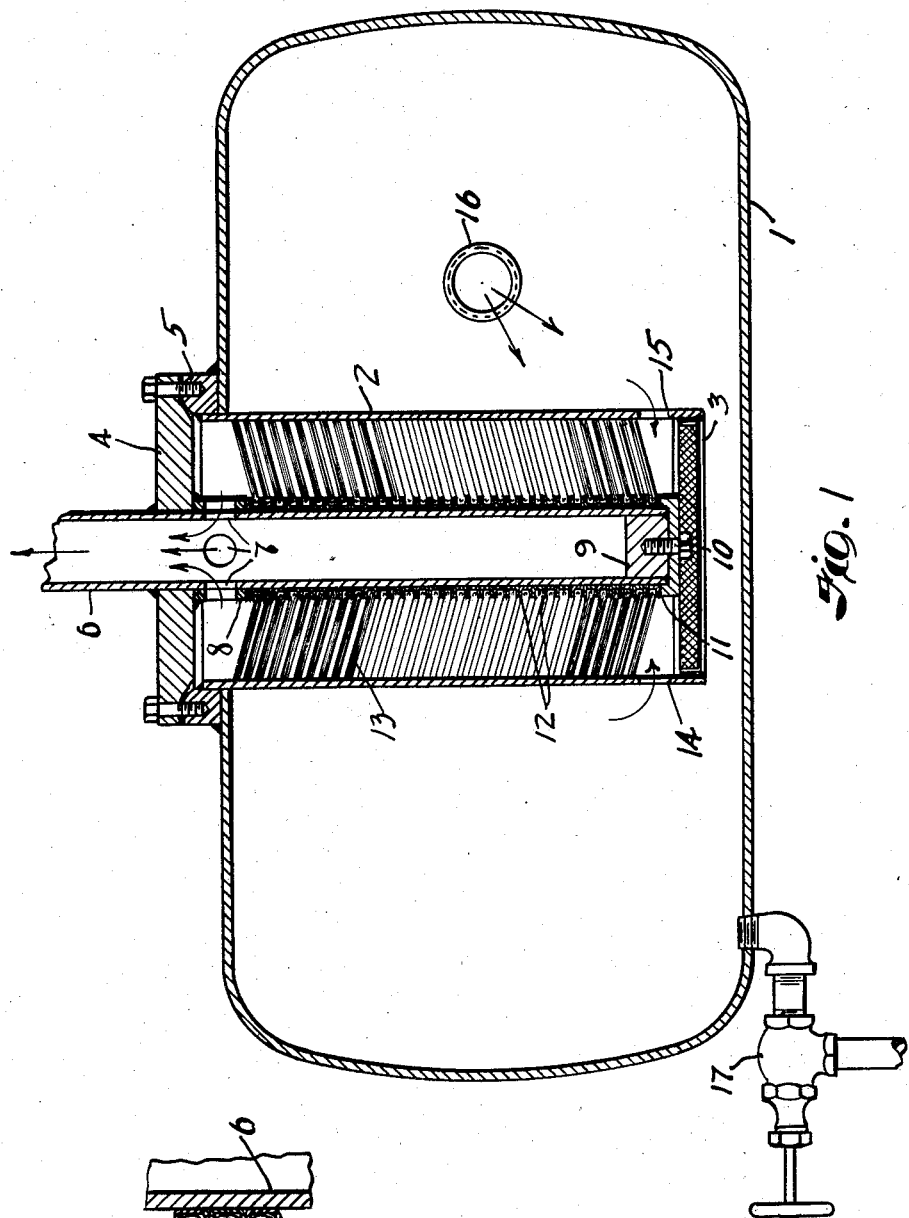
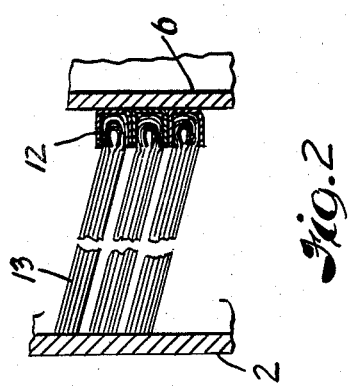
INVENTOR.
RUBEN O. PETERSON
BY
Oberlin & Limbach
ATTORNEYS.

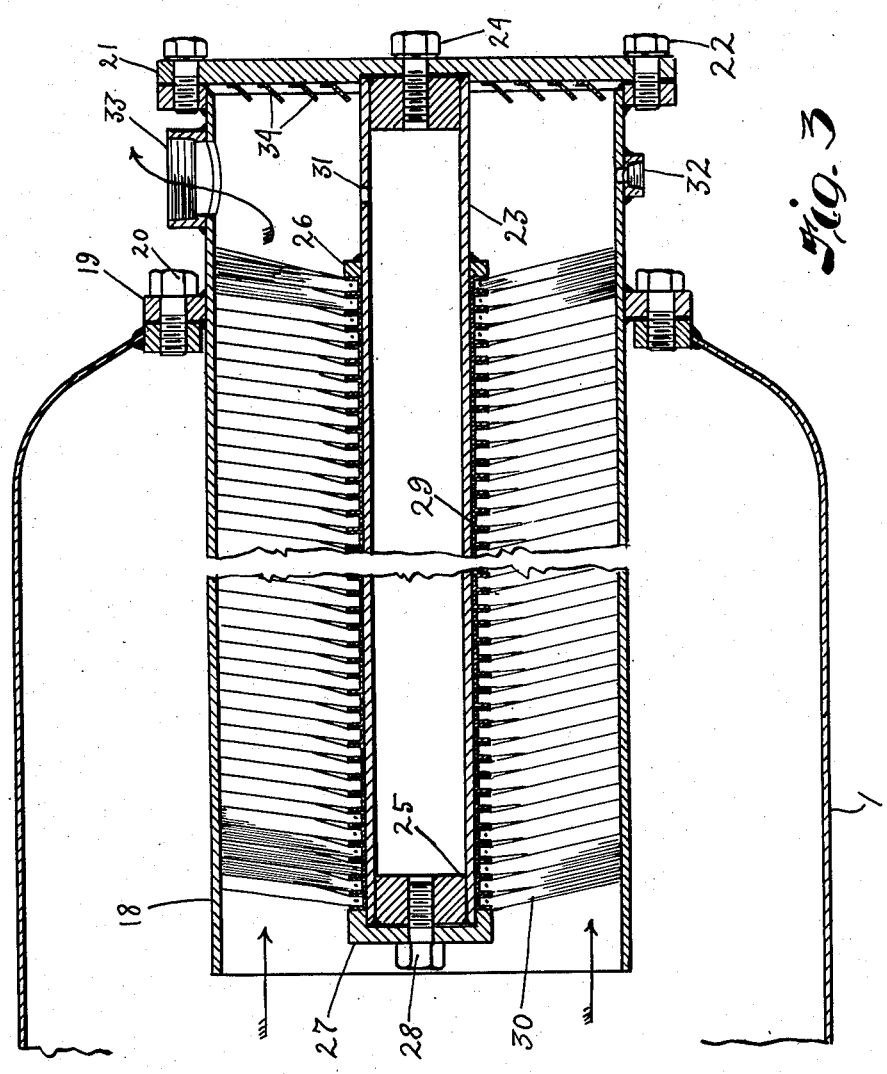

United States Patent Office 2,838,131
Patented June 10, 1958

2,838,131

SEPARATOR

Ruben O. Peterson, University Heights, Ohio, assignor to The Osborn Manufacturing Company, Cleveland, Ohio, a corporation of Ohio Application September 3, 1954, Serial No. 454,109

4 Claims. (Cl. 183—44)

This invention relates as indicated to a novel separator, and more particularly to a device designed to remove oil particles from compressed air.

Compressed air is widely used in industry for a multitude of purposes, and rotary compressors have been widely adopted for its production. It is important that small particles of oil entrained in the air be removed before the air is delivered from the receiver tank to the system where it is to be used. Various devices have been proposed in the past for this purpose, generally comprising arrangements of baffles with fibrous fillers such as wool adapted to trap and filter out the oil particles. While such devices are sometimes quite efficient when new and capable of removing as much as 99 percent of the entrained oil, they are not adequately self-cleaning and their efficiency rapidly drops in use as the separator becomes fouled.

Filters of the type disclosed and claimed in Abbrecht Patent 2,468,354 may also be utilized quite effectively in certain installations. It is a principal object of my invention, however, to provide a form of separator or filter particularly adapted to the removal of entrained oil particles and the like from compressed air, which apparatus will be substantially self-cleaning and yet require no moving parts.

Another object of my invention is to provide such separator which will be relatively inexpensive and simple of installation.

Still another object is to provide such separator which will not too greatly interfere with the flow of the compressed air from the receiver tank.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a longitudinal section through a compressed air receiver tank having my new separator installed therein;

Fig. 2 is an enlarged fragmentary detail view of several of the filter elements installed in such separator; and Fig. 3 is a longitudinal section through an air receiver tank having another embodiment of my new separator installed therein.

Now referring more particularly to said drawing, the embodiment of my invention illustrated in Figs. 1 and 2 comprises a cylindrical receiver tank 1 having a circular opening in its side in which the transverse separator cylinder 2 is welded with substantially the entire body of such latter cylinder extending within the receiver tank as shown, thereby forming a well within the tank which does not, however, extend entirely to the bottom of the latter. The lower end of this well is provided with a screen 3 of fine mesh effective to prevent turbulence in the vicinity of the surface of the oil which will accumulate in the bottom of the receiver tank.

The upper end of the well is fitted with an air-tight cover 4 gasketed and bolted in position on rim 5 welded to the tank. A pipe 6 passes through such cover and extends axially within well 2, being welded to the cover. As shown in Fig. 1, such pipe extends very nearly to the bottom of the well.

The portion of pipe 6 extending within the well is provided with openings such as 7 immediately inside the cover, the total area of such openings desirably being at least equal to the area of the cross-section of the pipe bore. An annular spacer 8 is fitted about pipe 6 immediately inside the cover for a purpose made clear below. The portion of pipe 6 extending downwardly from such spacer or shoulder 8 will preferably be somewhat roughened or grooved to provide small passages for the downward flow of oil. Fine threading of this portion of the pipe is a preferred means of providing such passages since such threading affords a long helical ramp adapted to facilitate the downward flow of oil but at the same time providing a long path of high resistance to a countercurrent of air.

The lower end of the pipe is plugged with a plug 9 which is drilled and tapped to receive a cap screw 10 securing a retaining element 11 in place. A number of annular brush sections 12, which may desirably be of the type disclosed and claimed in Whittle Patent 2,288,337, are fitted on pipe 6 between shoulder 8 and retaining element 11. Other forms of annular rotary brush sections well known in the art may likewise be utilized, or a length of brush strip such as that disclosed and claimed in my prior Patent 2,303,386 may be circularized to form a helix suitable for mounting on pipe 6. The brush bristle material 13 will preferably be somewhat longer than the radial space between pipe 6 and well 2 so that such bristles will be deflected in an upward direction when inserted within the well. Of course, such radially extending bristles are more densely compacted in the region of the brush back adjacent pipe 6 than in the outer peripheral region adjacent the wall of well 2. Ports such as 14 and 15 are provided in the lower portion of well 2 above screen 3 but below the brush material of the lowermost annular brush section.

Pipe 6 will, of course, be fitted with a valve (not shown) through which the clean air is delivered from the device. An inlet 16 is provided in the side of the receiver tank through which air is admitted from the compressor. At the bottom of the receiver tank is a valve 17 through which, at appropriate intervals, accumulated oil may be withdrawn.

While the dimensions of the equipment above described may be widely varied depending upon the requirements of any particular installation, a common size of receiver tank is two feet in diameter and four feet long built to withstand a pressure of about 103 pounds per square inch and having approximately a 15 cubic foot capacity. In a tank of such size, the tubular well 2 may have an inside diameter of one foot. A gasket may desirably be inserted between shoulder 8 and the uppermost annular brush section mounted on pipe 6.

In operation, air delivered from the compressor through inlet 16 to tank 1 will, of course, expand to fill the entire tank and will enter well 2 through the ports such as 14 and 15 located above the level of screen 3 and also above the level to which oil will be allowed to accumulate in the bottom of the tank. When the exit valve (not shown) on pipe 6 is opened, air will flow upward between the brush bristles and out through ports 7. Not only do the brush bristles slant upwardly due to the fact that they are somewhat longer than the radial space between pipe 6 and well 2, but also the normal flow of air will tend to keep the ends of the brush bristles pointing upwardly. This slant of the brush bristles serves to promote the flow of accumulated oil droplets along the bristles toward pipe 6 and since the brush bristles are naturally more densely packed near the brush back, the air velocity is considerably less in this region. The annular brush backs or the helically wound brush strip may be provided with radial indented grooves, well known in the art for purposes of ventilation, which facilitate flow of the oil to the outer surface of pipe 6 down which the oil will flow as well as downwardly between the bristles adjacent the brush back.

Many receiving tanks are used for the intermittent supply of air, and certain prior art types of separators will not drain of themselves during periods of idleness whereas my new separator will drain at all times.

It will be seen from the foregoing that I have provided a novel separator adapted to employ standard brush elements as the oil separating medium. Such elements may readily be removed and replaced when necessary, but the device is substantially self-maintaining and will require attention only at infrequent intervals other than periodically draining off the accumulated oil through valve 17. My new separator is effective to remove substantially all of the oil from compressed air systems and the like as well as trapping and flushing out any dirt particles, etc., which may be entrained. A wide variety of brush bristle materials may be employed, including horsehair, Tampico fiber, steel wire, copper wire, aluminum wire, nylon coated wire, and synthetic plastic monofilaments. It is preferred that the brush bristle material should not lie in a horizontal plane but should extend or slope downwardly to facilitate drainage of accumulated liquid particles. Obviously, various other types of brush elements such as straight lengths of brush strip, etc., may be thus employed. In my separator I have provided a preferred upwardly directed path for the air which is impeded by a directional maze of downwardly slanting filaments adapted to collect and coalesce fine oil particles to form droplets which will flow along such filaments to a preferred central path leading to the bottom of the tank. If desired, means may be provided for admitting air from the compressor to the upper end of pipe 6 during periods when there is no demand on the system. In this way, a blow-back may be provided downwardly through the separator more rapidly to purge the accumulation of oil therein. There is not ordinarily any need for this arrangement, however.

While it is ordinarily sufficient simply to employ brush elements having brush material of sufficient length to fit the well snugly and so that the latter will be caused to slant upwardly as shown when inserted in the well, the annular brush back may, if desired, be deformed to afford a permanent slant of this nature. The minute droplets entrained in the compressed air or other gas are collected on the filaments and coalesce into larger drops which flow downwardly along such filaments. When the filaments are more densely compacted, capillary action assists the inward and downward flow of the liquid. While slightly crimped brush material may be employed, substantially straight filaments are ordinarily preferred as providing a somewhat more dense body and facilitating flow of the collected liquid. As above explained, the upward flow of the gas is, of course, restricted in the more densely compacted region of the body of filaments, this also being formed by the lower ends of the filaments toward which the collected liquid tends to flow. The degree of slant of the filaments may vary in different installations but should be at a substantial angle to the horizontal for best results. In some cases, filaments may even extent vertically, with the principal flow of gas being through the upper portion of the body of filaments.

Referring now more particularly to the embodiment of the invention illustrated in Fig. 3 of the drawing, a horizontal cylindrical "well" 18 is shown installed in one end of the tank, being secured to the latter by means of a gasketed peripheral collar 19 and bolts 20. An outer air-tight cover 21 closes the outer end of well 18 to which it is secured by means of bolts 22. Such cover carries an inner axial tubular member 23 secured thereto by means of bolt 24 and closed at its inner end by means of plug 25. A peripheral collar 26 is welded to the tube at a point spaced from cover 21 and an end cap 27 is secured to the other end of the tube by means of screw 28 threaded in plug 25. Between such cap and shoulder there is mounted a length of helically wound brush strip which may have a sheet metal channelform back 29 in which brush bristle material 30 is secured by means of an elongated retaining element such as a wire, such brush material extending generally radially and contacting the inner wall of well 18. As in the case of the Fig. 1 embodiment, such brush material may desirably be sufficiently long that it will slant somewhat when tube 23 with the helically wound brush element mounted thereon is inserted axially within such well.

Tube 23 is vented at 31, and the cavity within well 18 between brush material 30 and cover plate 21 is provided with a drain 32 which may be connected to appropriate valve means. An upper outlet 33 from this same cavity permits withdrawal of air from the pressure tank 1.

In use, when air is withdrawn from the tank, it must pass from left to right as viewed in Fig. 3 through the brush material 30 to reach the cavity defined between such brush material and cover plate 21. Oil droplets coalescing on the brush material will drain downwardly, eventually reaching the bottom of such cavity from which the oil may be withdrawn through drain 32. The flow of air through the brush material tends to prevent accumulated oil from flowing in the contrary direction and dripping from the end of well 18 into tank 1. However, any oil which thus escapes into the tank may be withdrawn through the valved drain 17. A plurality of horizontal baffles 34 are provided on the inner surface of cover plate 21 to assist in preventing pick-up of oil by air passing upwardly to outlet 33.

If there is any appreciable amount of moisture in the air, it will be desirable to utilize brush material which is non-rusting in character, such as stainless steel or other non-rusting wire and nylon and other plastic monofilaments. While the brush material may be sligthly crimped, it should nevertheless be substantially straight for best results, the production of narrow interstices therebetween having an effective capillary action on the accumulating oil droplets. The number of annular brush sections employed or the number of turns of helically wound brush strip will depend considerably on the type of installation and the volume of air to be handled. In any event, a number of layers of brush material will be utilized to trap the entrained oil droplets.

Other modes of applying the principle of the invention may be employed, change being made as regards the details described, provided the features stated in any of the following claims or the equivalent of such be employed.

I therefore particularly point out and distinctly claim as my invention:

1. A device for separating minute droplets of oil and the like from compressed air systems comprising a horizontally extending cylindrical pressure tank, a transverse cylindrical well in said tank having an upper outer end opening to the side thereof, said well extending a major portion of the tank diameter but with its lower inner end substantially spaced from the opposite tank wall, mesh closing the lower end of said well, an air-tight gasketed cover removably closing the upper end of said well, a pipe extending through said cover and axially of said well substantially the entire depth of the latter, the lower end of said pipe being closed, lateral openings in said pipe communicating with the annular space between the pipe and the well wall adjacent said cover, lateral openings in said well adjacent said mesh communicating with the interior of said tank, said pipe having its outer surface lightly helically grooved; a plurality of annular brush sections stacked on said pipe within said well, said brush sections each comprising an annular back dimensioned closely to fit the outer periphery of said pipe and having radial grooves, and dense bristle material secured in said back and extending generally radially therefrom, said bristles being longer than the radial distance between said back and the inner wall of said well and being inclined outwardly upwardly in engagement with said wall; a valved outlet in the bottom of said tank for withdrawal of accumulated liquid, and an inlet to said tank substantially above the level of said mesh.

2. A device for separating minute droplets of oil and the like from compressed air systems comprising a pressure tank, a vertically extending well in said tank, baffle means in the lower end of said well, such end being spaced from the inner wall of said tank, said well having a closure for its outer end, a pipe extending through said closure axially of said well substantially the entire length of the latter, the lower end of said pipe being closed, lateral openings in said pipe communicating with the annular space between the pipe and the well wall adjacent such closure, lateral openings in such well wall adjacent said baffle means communicating with the interior of said tank, said pipe having its outer surface helically grooved; rotary brush elements having an annular back fitting the outer periphery of said pipe and provided with generally radial grooves, brush material secured in said back and extending generally radially therefrom, said brush material being longer than the radial distance between said back and the inner wall of said well and being inclined outwardly upwardly in engagement with said wall; a valved outlet in the bottom of said tank for withdrawal of accumulated liquid, and an inlet to said tank substantially above the level of said baffle means.

3. A device for removing suspended droplets of oil and the like from compressed air systems comprising a pressure tank, a vertically extending well in said tank closed at its outer end, an elongated support member extending axially within said well and having a slightly roughened exterior surface, an annular rotary brush element fitted on said support member and having brush material extending generally radially outwardly, said brush material being longer than the radial space defined by the inner wall of said well and being inclined outwardly upwardly in engagement with said wall; an air inlet to said tank, an oil outlet from said tank, said tank being in communication with said well below said brush material, and a duct leading from the space within said well above said brush material to the exterior of said tank.

4. A device for separating materials such as liquids entrained in gases, comprising a container, a cylindrical well within said container communicating therewith at its inner end, an inlet to said container, an outlet from the other end of said well, a central cylindrical support having a diameter constituting a substantial proportion of the diameter of said well mounted co-axially within said well, and a plurality of turns of circularized brush elements having their backs encircling and mounted on said central support with thick layers of brush filaments extending radially outwardly thereof, said filaments being longer than the radial space afforded by said well and all sloping from end to end in the same manner relative to the axis of said support, for flow of such gases transversely of said filaments from the inner end of said well to said outlet, whereby thinning of the bristle layers due to divergence of said bristles is minimized.

References Cited in the file of this patent

UNITED STATES PATENTS

| | | |
|---|---|---|
| 1,531,096 | Hoffman | Mar. 24, 1925 |
| 1,888,813 | Winslow | Nov. 22, 1932 |
| 2,468,354 | Abbrecht | Apr. 26, 1949 |
| 2,642,954 | Le Valley | June 23, 1953 |
| 2,660,261 | Jeffrey | Nov. 24, 1953 |

FOREIGN PATENTS

| | | |
|---|---|---|
| 538,282 | Great Britain | July 28, 1941 |
| 606,674 | Germany | Dec. 7, 1934 |